United States Patent [19]

Nunomura

[11] Patent Number: 4,942,524
[45] Date of Patent: Jul. 17, 1990

[54] SOFTWARE TRAP SYSTEM WHICH SAVES PREVIOUS CONTENT OF SOFTWARE TRAP HANDLING POINTER IN A STACK UPON EXECUTION OF A TRAP

[75] Inventor: Yasuhiro Nunomura, Itami, Japan

[73] Assignee: Mitsubishi Denki K.K., Tokyo, Japan

[21] Appl. No.: 65,778

[22] Filed: Jun. 24, 1987

[30] Foreign Application Priority Data

Sep. 3, 1986 [JP] Japan ................................ 61-208420

[51] Int. Cl.⁵ .............................................. G06F 9/00
[52] U.S. Cl. ................................. 364/200; 364/244.3; 364/261.6; 364/254.5; 364/242.2
[58] Field of Search ... 364/200 MS File, 900 MS File

[56] References Cited

U.S. PATENT DOCUMENTS

| 3,725,876 | 4/1973 | Hauck | 364/200 |
|---|---|---|---|
| 3,909,797 | 9/1975 | Goss et al. | 364/200 |
| 4,074,353 | 2/1978 | Woods et al. | 364/200 |
| 4,124,892 | 11/1978 | Jones et al. | 364/900 |
| 4,241,399 | 12/1980 | Strecker et al. | 364/200 |
| 4,250,546 | 2/1981 | Boney et al. | 364/200 |
| 4,338,663 | 7/1982 | Strecker et al. | 364/200 |
| 4,438,492 | 3/1984 | Harmon, Jr. et al. | 364/200 |
| 4,628,477 | 12/1986 | Burrows | 364/900 |
| 4,679,138 | 7/1987 | Epstein et al. | 364/200 |
| 4,719,565 | 1/1988 | Moller | 364/200 |
| 4,742,449 | 5/1988 | Epstein et al. | 364/200 |
| 4,763,242 | 8/1988 | Lee et al. | 364/200 |

OTHER PUBLICATIONS

IAPX286 Programmer's Reference Manual, B-45-47, Intel Corp. 1983.
NS16000 Instruction Set Reference Manual, pp. 6-14, National Semiconductor Corp., 1983.

*Primary Examiner*—Archie E. Williams, Jr.
*Assistant Examiner*—Eric Coleman
*Attorney, Agent, or Firm*—Kanesaka & Takeuchi

[57] ABSTRACT

A computer has a software trap handling pointer for holding the storing location of the information saved in the memory. At the setting of a software trap, the information containing the content of the software trap handling pointer is saved in the memory by means of a stack mechanism, and a value indicating the saved location is stored in the software trap handling pointer. At the time of a software trap return, the information containing the content of the software trap handling pointer which has been stored at the setting of the software trap is restored by means of the stack mechanism.

4 Claims, 6 Drawing Sheets

SOFTWARE TRAP SYSTEM WHICH SAVES PREVIOUS CONTENT OF SOFTWARE TRAP HANDLING POINTER IN A STACK UPON EXECUTION OF A TRAP

BACKGROUND OF THE INVENTION

1. Field of the Invention

The present invention relates to computers having a trapping function, more particular to a computer having an improved system for processing software traps.

2. Description of the Prior Art

The methods of transferring control of the programs to be processed in a computer include subroutine calls, interrupts, and traps. Traps are an interrupt request internally generated as a direct and immediate result of the detection of an exceptional condition by memory manangement, such as the execution of an illegal operation or undefined instruction, the overflow of computation results or division by zero, the execution of a breakpoint or program trace in debugging, and the execution of a software trap setting instruction. Software trap setting instructions are used to set a trap intentionally by program for calling a trap process program, which is comparable to subroutine calls. They are useful for changing the executive environment of a program, especially for calling a service program provided in the system. Examples are the INT instruction for the U.S. Intel Corporation 16-bit microprocessor iAPX 86, the TRAP instruction for the U.S. Motorola Co. 16-bit microprocessor MC 68000, and the SVC instruction for the U.S. National Semiconductor Co. 32-bit microprocessor NS 32032.

The control of a program call by a subroutine call, interrupt, or trap works well with a stack mechanism for stacking data by a last-in, first-out method. When a subroutine is called from a program in execution or control is transferred to another program by an interrupt or trap, the return address and other necessary information are stored in a stack, and the information in the stack restored upon completion of process of the subroutine or interrupt or trap. The return address is also restored to restart execution of the instruction at the address. In such a mechanism, the last stored information is first restored so that even if a program is called in nesting, control is always returned to the orignal calling program upon completion of the process of a routine or program. Most of the present computers makes such control by means of the stack mechanism.

Figure 5:
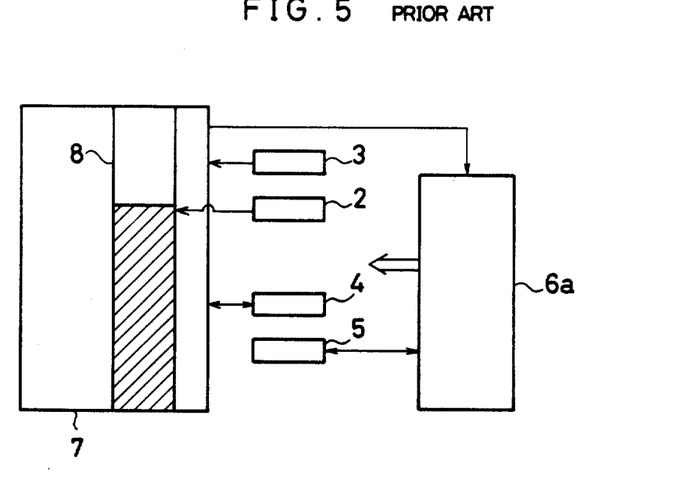
FIG. 5 is a block diagram of a conventional computer having a software trap setting instruction.

FIG. 5 shows in block form a conventional computer having a stack mechanism to make such call control. It consists of a main memory 7, a program counter 3 for holding an address in the main memory 7 in which the instruction to be executed is stored, a stack pointer 2 for pointing to the highest location of data stacked in the main memory 7 by a last-in, first-out method, a general or special purpose register 4, a control register 5 for holding control or status flages of the computer, and a control unit 6b. The main memory 7 has a stack area 8 for stacking data by a last-in, first-out method, and the highest location of data stacked in this area is pointed to by the stack pointer 2. The control unit 6b is provided to interpret the instruction retrieved from the main memory 7 at the address indicated by the program counter 3 and control its execution and the transmission of data between the program counter 3, stack pointer 2, register 4 and control register 5, and the main memory 7.

Figure 6:
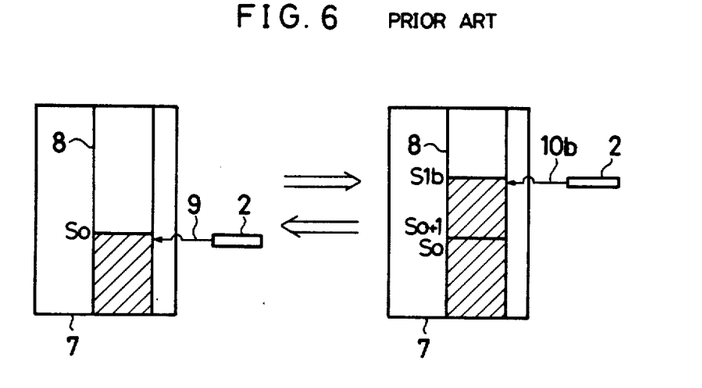
FIG. 6 shows the stacking states in the main memory of the conventional computer before and after the execution of a software trap setting instruction.

How a trap is set in such a computer will be described. FIG. 6 shows the stacking states in the main memory 7 before and after the setting of a trap. Before the setting a trap, the stack pointer 2 holds a stack location [S0] and points to the highest location of data stacked in the stack area 8 by the previous execution of a program as shown by an arrow 9. At the setting of a trap, the necessary information containing a return address is stored in the stack area 8 between stack locations [S0+1] and [S1b], and the content of the stack pointer 2 is updated to the stack location [S1b] as shown by an arrow 10b. Then, the top address of a specific trap processing program inherent to the computer or operating system is stored in the program counter 3. As a result, the next instruction is retrieved from the main memory 7 at the address stored in this program counter 3 for execution. The information stored in the stack area 8 between the locations [S0+1]and [S1b] may be the content or return address of the program counter 3, the contents of the control register 5 and general or special purpose register 4, and specific data in the main memory 7. For example, the return address and the content of a control register are stored for the Motorola Co. MC68000.

Next, the trap return, which corresponds to the above trap setting, will be described. In a trap processing program, stack areas may be used for a certain purpose, but they must be released immediately before a trap return, and the stack pointer 2 must be in the state immediately after the setting of a trap as shown by the arrow 10b. From this state, the information stored between the stack locations [S0+1] and [S1b] is returned. This information has been saved at the setting of a trap. If the contents of a control register or general or special purpose register have been stored, they are returned. If the specific data in the main memory have been saved, the necessary one and the return address are returned. This return of the return address brings control back to the program which was executed before the setting of a trap. The stack pointer 2 is returned to the state before the setting of a trap as shown by the arrow 9. The control unit 6b1 provided to control these trap setting and return operations.

Figure 7:
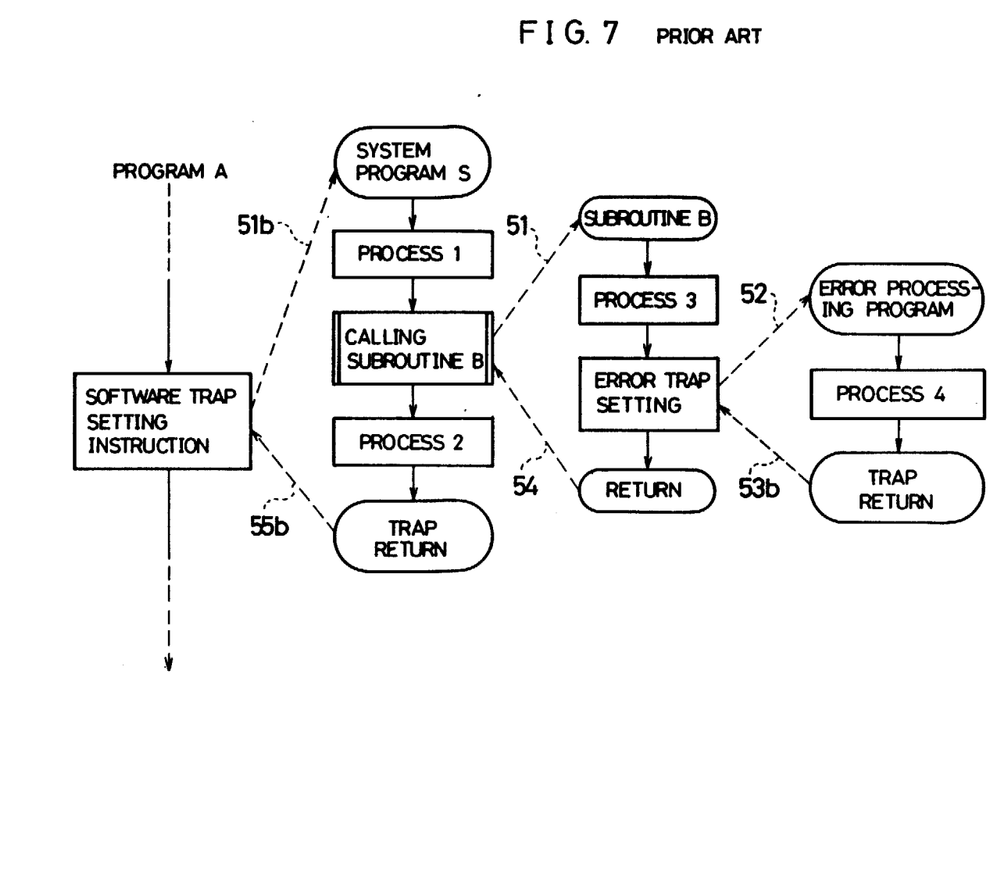
FIG. 7 is a flowchart showing the transfer of program control in execution of a software trap setting instruction in the conventional computer.
Figure 8:
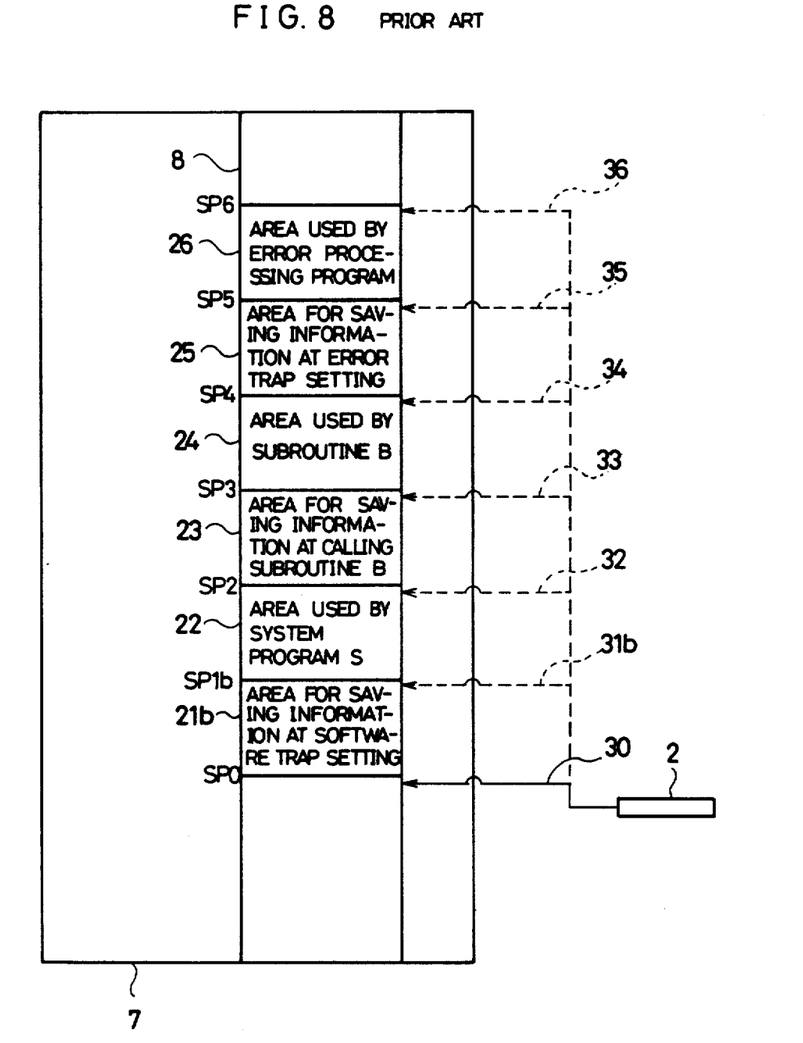
FIG. 8 shows changes in the stacking state durng the above execution.

In such a computer, the stack grows dynamically every time a program or subroutine is called. For example, when a setting instruction, and the called system program S calls a subroutine B as shown in FIG. 7, the stack changes as shown in FIG. 8. The stack pointer 2, which has pointed to a stack location [SP0] as shown by a solid arrow 30 immediately before the execution of a software trap setting instruction, now points to a stack location [SP1b] when the information containing a return address is stored at the highest stack area 21b as shown by a broken arrow 31b by the operation of a trap set by execution of the software trap setting instruction. If the area 22 is used for a certain purpose in execution of the process 1 of the system program S (FIG. 7,) the stack pointer 2 is in a state such as shown by a broken arrow 32 immediately before the subroutine B is called from the system program, indicating a stack location [SP2]. Then, when the subroutine B is called, the information containing a return address is stored in the highest stack location 23, and the stack pointer 2 points to a stack location [SP3] as shown by a broken arrow 33.

Suppose that the execution of the process 3 of the subroutine (FIG. 7) is controlled with the information of the program A saved in the area 21b under a software trap setting instruction. An example is that decision on an interrupt request generated in execution of the subroutine B is made with the identification information for interrupt enable stored in the area 21a. There are two methods for processing such a case.

One of the two methods is that reference is made to the identification information from the information saved in the area 21b under a software trap setting instruction. To do this, it is necessary to store at the time of a subroutine call, trap, or interrupt a return address and the location in which the information has been stored at the time of a previous subroutine call, trap, or interrupt. When reference is made to the identification information in the area 21b from the subroutine B, the stack location indicating the area 21b must be found from the information saved in the area 23 for making reference to the desired identification information.

The other method is to transfer as a parameter the identification information used in the subroutine B once for each call. To achieve this, it is necessary to copy the identification information in the area 21b into the area 23 at the time of calling the subroutine B from the system program S. In this case, reference to the identification information from the subroutine B is made to the copy of the original identification information in the area 23.

When the number of calling stages is as small as in this example, the additional procedure for reference to the identification information is not very burdensome. However, when reference is made to the identification information from a subroutine called in many levels of nesting or recursive definition this additional procedure reduces the process efficiency to a large extent. The latter method is better than the former in terms of efficiency in reference to the identification information but requires an additional memory area for copying the identification information for every call. This waste increases with the size of the identification information or the number of nesting levels for call.

The feature of a stack that program control is always returned to the calling program can be impractical for some applications. For example, when an error trap is set from an error in conditions for calling the system program S from the program A in execution of the subroutine B, thereby calling an error processing program, even if the continuation of process of the system program S is found impossible in the error processing program, control is not immediately returned to the program A but to the subroutine B from the error processing program by a trap return as shown by an arrow 53b in FIG. 7, to the system program S from the subroutine B as shown by an arrow 54, and then to the program A from the system program S by a trap return as shown by an arrow 55b in FIG. 7. Apparently, this is an excessive process. In addition, in order to avoid an "error chain reaction" by which an error brings about another error, it is necessary to carry out another error decision process. Such an error decision process is executed even in a normal process with no errors, thus reducing the program process efficiency.

By the conventional technology, when a program or subroutine called directly or indirectly under a software trap setting instruction is executed, it is very difficult to make reference to the information about the calling program saved in the memory at the setting of a software trap, and fine control, such as interrupt enable, becomes a complicated process. It is also difficult to make an immediate return to the calling program which has executed the software trap setting instruction from the called program or subroutine.

SUMMARY OF THE INVENTION

In accordance with the invention there is provided a computer in which reference to the information of the calling program saved at the setting of a software trap is easy to make in execution of a program or subroutine called directly or indirectly under a software trap setting instruction, and control can be returned immediately to the calling program which has executed the software trap setting instruction from the called program or subroutine.

Other objects, features, and advantages of the invention will become more apparent from the following description when taken in conjunction with the accompanying drawings.

DESCRIPTION OF THE PREFERRED EMBODIMENTS

Figure 1:
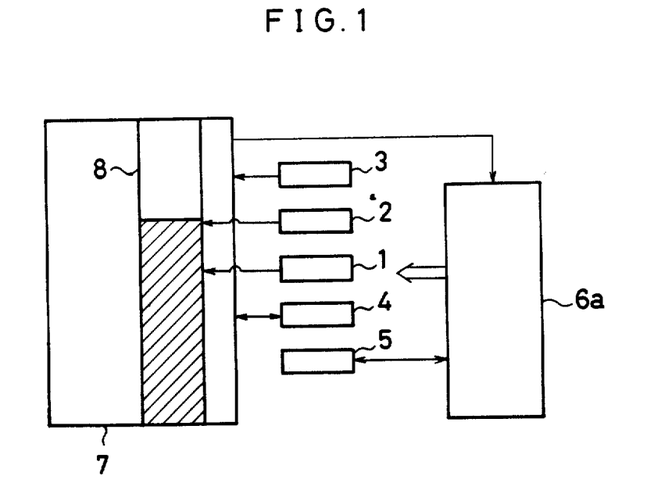
FIG. 1 is a block diagram of a computer embodying the present invention.

Referring now to FIG. 1 there is shown in block form a computer consisting of a software trap handling pointer 1, a main memory 7 at which the instruction to be executed is stored, a stack pointer 2 for pointing to the highest location of data stacked in the main memory 7 by a last-in, first-out method, a general or special purpose register 4, a control register 5 for holding control or status flags of the computer, and a control unit 6a. The main memory 7 has a stack area 8 for stacking data by a last-in, first-out method, and the highest location of data stacked in this area is pointed to by the stack pointer 2. The control unit 6a is provided to interpret an instruction retrieved from the main memory 7 at the address indicated by the program counter 3 and control not only execution of the instruction but also transmission of data between the software trap handling pointer 1, program counter 3, stack pointer 2, register 4 and control register 5, and the main memory 7.

Figure 2:
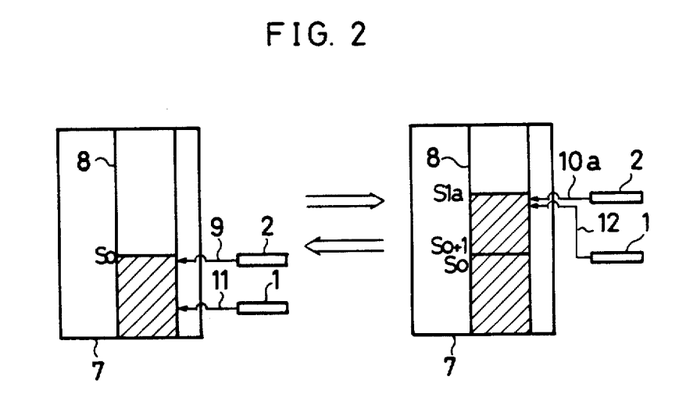
FIG. 2 shows the stacking states in the main memory of the computer before and after a software trap setting instruction is executed.

First of all, how a software trap is set by the execution of a software trap setting instruction in the computer will be described. FIG. 2 shows the stacking states in the main memory of the computer before and after the setting of a software trap. Immediately before the setting of a software trap, the stack pointer 2 holds a stack location [S0] and points to the highest location of data stacked in the stack area 8 by the previous execution of a program as shown by an arrow 9. The software trap handling pointer 1 holds the stack location of data saved by execution of the previous software trap setting instruction as shown by an arrow 11. When the software trap is set, the information containing the content of the software trap handling pointer 1 and a return address is stored in the stack area between stack locations [S0+1] and [S1a], and the contents of the stack pointer 2 and software trap handling pointer 1 are updated to the stack location [S1a] as shown by arrows 10a and 12, respectively.

Then, the top address of a specific software trap processing program inherent to the computer or operating system is stored in the program counter 3. Consequently, the next instruction is retrieved for execution from the main memory at the address stored in this program counter. The content of the software trap handling pointer 1 after the execution, however, does not change until the execution of a software trap return unless another software trap is set. The information stored between the stack locations [S0 +1] and [S1a] may be the content of the software trap handling pointer 1, the content or return address of the program counter 3, the contents of the control register 5 and general or special purpose register 4, and specific data in the main memory 7.

Next, the operation of a software trap return, which is comparable to the software trap setting, will be described. When the stack area is used for a certain purpose in a software trap processing program, the stack pointer 2 can be in a state other than that immediately before the setting of a software trap as shown by the arrow 10a. However, the software trap handling pointer 1 is in the state as shown by the arrow 12 so that it is unnecessary to release the stack areas even immediately before a software trap return.

At the beginning of a software trap return, the content of the software trap handling pointer 1 is copied in the stack pointer 2, thus automatically releasing these stack areas. From this state, the information stored in the highest stack location between [S0+1] and [S1a] is returned. This information has been saved at the setting of a software trap. If the contents of the control register 5 or general or special purpose register 4 have been saved, they are returned. If the specific data in the main memory have been saved, the necessary data are returned, and the return address and the content of the software trap handling pointer 1 are returned. These returns bring control back to the program which has executed the software trap setting instruction, and the software trap handling pointer 1 and stack pointer 2 back to the states immediately before the setting of the software trap as shown by the arrow 11 and 9, respectively. The control unit 6a controls these software trap setting and return operations.

Figure 3:
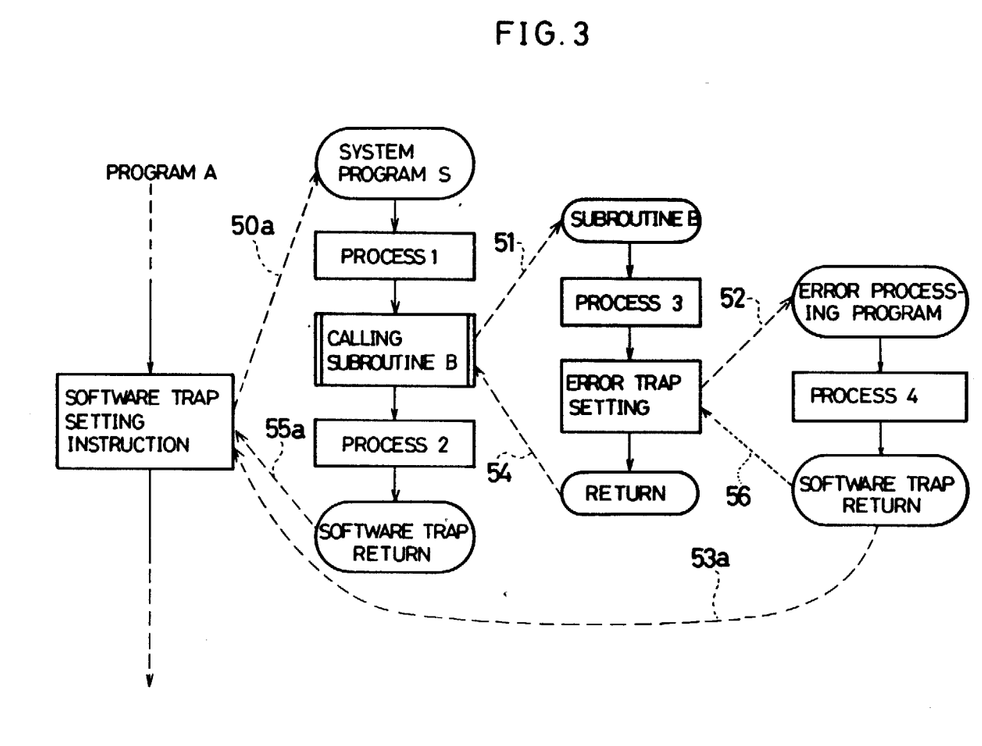
FIG. 3 is a flowchart showing the transfer of program control in execution of a software trap setting instruction in the computer.
Figure 4:
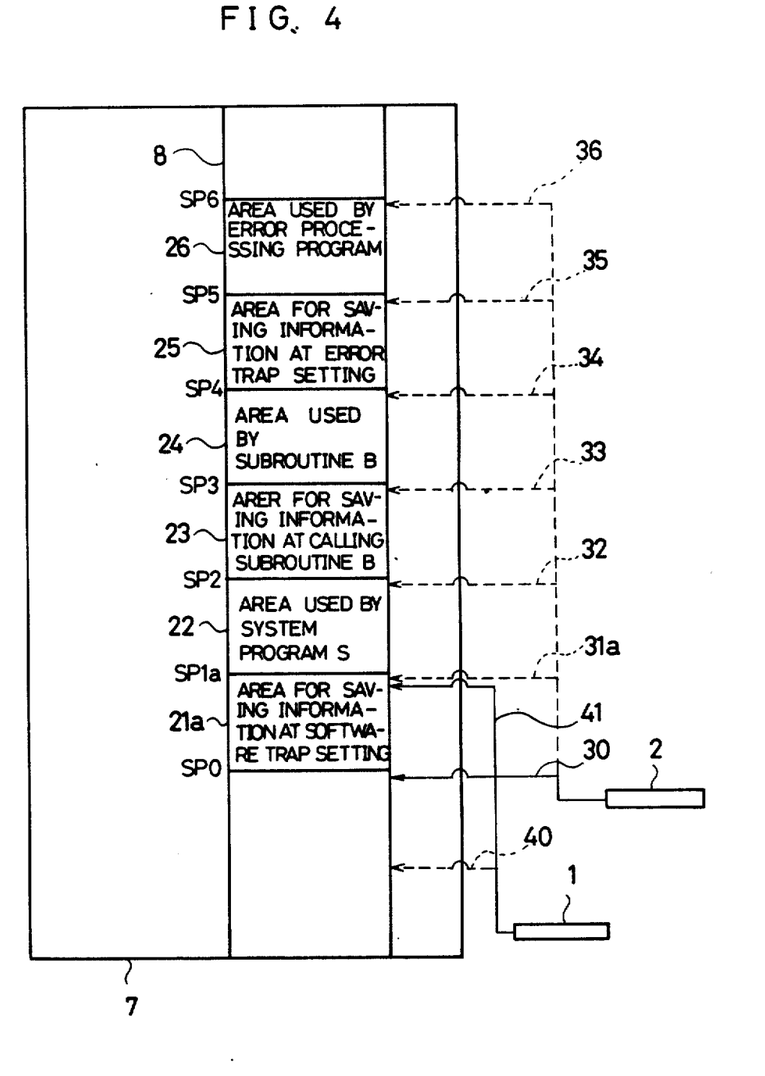
FIG. 4 shows changes in the stacking state during the above execution.

In this computer, too, the stack grown dynamically every time a program or subroutine is called, changing the content of the stack pointer 2 accordingly. However, the content of the software trap handling pointer 1 does not change unless the process of a software trap is completed or another software trap setting instruction is executed. For example, a program A calls a system program S under a software trap setting instruction, and the called system program S calls a subroutine B as shown in FIG. 3, the stack changes as shown in FIG. 4. Immediately before the execution of a software trap setting instruction, the software trap handling pointer 1 points to the stack location of data saved in the main memory 7 under the previous software trap setting instruction as shown by a broken arrow 40, and the stack pointer 2 points to the stack location [SP0] as shown by a solid arrow 30. However, when some information containing the content of the software trap handling pointer 1 and the return address is stored in the highest stack area 21a by the execution of a software trap setting instruction, the software trap handling pointer 1 and stack pointer 2 point to the stack location [SP1a] as shown by solid and broken arrows 41 and 31a, respectively.

If the area 22 is used for a certain purpose in execution of the process 1 of the system program S (FIG. 3), the stack pointer 2 points to a stack location [SP2] as shown by a broken arrow 32. Then, when the subordinate B is called, some information containing the return address is stored in the highest stack area 23, and the stack pointer 2 points to a stack location [SP3] as shown by a broken arrow 33. However, the content of the software trap handling pointer 1 doies not change until the process of the software trap is completed or another software trap setting instruction is executed. For example, when a new software trap setting instruction is executed in execution of the process 3 of the subroutine B in FIG. 3, the information containing the content of the software trap handling pointer 1 and the return address is saved in the stack, and a new value is stored in the software trap handling pointer 1. When the process of this new software trap is completed, the content saved in the software trap handling pointer 1 can be retrieved from the stack to restore the previous state.

Suppose the execution of the process 3 of the subroutine B (FIG. 3) is controlled with the information of the program A saved in the area 21a by the setting of a software trap. An example is that when identification information for interrupt enable is contained in the area 21a, an interrupt request made in execution of the subroutine B is to be decided with this identification information. In this case, reference can be made to the identification information as soon as the location of the identification information in those saved in the area 21a is found from the content of the software trap handling pointer 1. The format of information saved at the setting of a software trap is inherent to the computer so that the location of identification information always is spaced by a specific distance from the stack location indicated by the software trap handling pointer 1. Consequently, reference to the identification information can be made from not only the subroutine B but also any program or subroutine called directly or indirectly under a software trap setting instruction unless another software trap is in execution.

The information pointed to by the software trap handling pointer 1 contains the return address saved by the software trap setting instruction last executed, control can be returned to the program which has called the last executed software trap setting instruction regardless of the nesting condition of the program. For example, when an error trap is set by the occurrence of an error in calling conditions from the program A to the system program S in execution of the subroutine B, thereby calling an error processing program, if the continuation of process of the system program is found impossible in the error processing program, control is returned immediately to the program A by a software trap return. Consequently, no additional error decision is required in the process 2 of the system program (FIG. 3) to avoid an error chain reaction, thus increasing the program processing efficiency. If the error is made recoverable in the process 4 of the error processing program (FIG. 3), it is also possible to return control to the subroutine B by a conventional trap return as shown by a dotted arrow 56.

In the above embodiment, the respective numbers of stack areas in the main memory and stack pointers are one, but pluralities of stack areas and stack points may be provided to save the information about the software trap handling pointer and other information in separate stacks or switch between the stacks under a software trap setting instruction. Alternatively, the special stack for the software trap handling pointer may be provided in another memory such as a register stack or cashe memory. The general or special purpose register or control register may be omitted or a plurality of them may be used. In either case, similar results are obtained.

While a preferred embodiment of the invention has been described using specific terms, such description is illustrative purposes only, and is to be understood that changes and variations may be made without departing from the spirit and scope of the invention defined in the following claims.

What is claimed is:

1. A system for processing a software trap, which comprises
    a memory;
    a stack pointer for holding a highest stack location of data stored in multiple layers in said memory during previous execution of a program;
    a software trap handling pointer for holding a stack location of data saved during execution of a previous software trap setting instruction; and
    a control unit comprising (a) means for storing information including the content of said software trap handling pointer and a return address in a location of said memory by a last-in, first-out method and a value indicating said location in said software trap handling pointer at the time of setting of software trap and (b) means for restoring said program by retrieving said return address from said memory at the time of a software trap return;
    said information containing the content of said software trap handling pointer and said return address being stored in a stack area between said highest stack location and a next stack location, and the contents of said stack pointer and software trap handling pointer being updated to said next stack location at the time of setting a software trap.

2. A system according to claim 1, wherein the content of said software trap handling pointer is copied in said stack pointer at the beginning of a software trap return so as to release automatically said stack area.

3. A system for processing a software trap, which comprises:
    a main memory for storing instructions and having a stack area;
    a program counter for holding an address of a next instruction to be fetched from said main memory for execution;
    a stack pointer for holding a highest stack location of data stored in multiple layers in said stack area during previous execution of a program;
    a software trap handling pointer for continuously holding a stack location of data saved during execution of a previous software trap setting instruction; and
    a control unit comprising (a) means for interpreting an instruction fetched from said main memory at an address specified by said program counter and (b) means for controlling not only execution of said instruction but also transmission of data between said software trap handling pointer, program counter, stack pointer, and main memory, said control unit including (a) means for storing, when a software trap is set, information including contents of said software trap handling pointer and a return address in a stack area between said highest stack location and a next stack location, and (b) means for updating contents of said stack pointer and software trap handling pointer to said next stack location but keeping contents of said software trap handling pointer unchanged at said next stack location until said software trap instruction has been executed or a new software trap is set while contents of said stack pointer are continuously updated to a new highest stack location every time a new subroutine or trap servicing program is called, thereby making not only immediate return to said program possible at the time of a software trap return but also additional error decision in said subroutine unnecessary, thus resulting in the increased program processing efficiency.

4. A method of processing a software trap in a computer having a stack architecture with a stack pointer and a software trap handling pointer for storing data by a last-in, first-out technique, which comprises the step of:
    storing information including contents of said software trap handling pointer and a return address in a first stack area when a software trap occurs;
    pointing with both said stack pointer and said software trap handling pointer to an uppermost position in said first area;
    storing data in a second area which is higher in position than said first stack area;
    pointing with said stack pointer to an uppermost position of said second stack area;
    starting a software trap return;
    pointing with said stack pointer to said first area to which said software trap handling pointer has pointed; and
    releasing said first stack area in which said information containing said return address has been stored.

* * * * *